United States Patent
Tong et al.

(10) Patent No.: US 12,501,855 B2
(45) Date of Patent: Dec. 23, 2025

(54) HEIGHT ADJUSTING MECHANISM AND LAWN MOWER CONTAINING SAME

(71) Applicant: NINGBO LINGYUE INTELLIGENT EQUIPMENT CO., LTD, Zhejiang (CN)

(72) Inventors: Baijun Tong, Ningbo (CN); Shengqiu Zhu, Ningbo (CN); Chaojie Tao, Ningbo (CN); Shulin Peng, Ningbo (CN); Jufeng Miao, Ningbo (CN); Xiaobo Ye, Ningbo (CN)

(73) Assignee: NINGBO LINGYUE INTELLIGENT EQUIPMENT CO., LTD, Ningbo (CN)

( * ) Notice: Subject to any disclaimer, the term of this patent is extended or adjusted under 35 U.S.C. 154(b) by 659 days.

(21) Appl. No.: 17/975,587

(22) Filed: Oct. 27, 2022

(65) Prior Publication Data
US 2024/0040962 A1 Feb. 8, 2024

(30) Foreign Application Priority Data

Aug. 2, 2022 (CN) .......................... 202210923126.0
Aug. 2, 2022 (CN) .......................... 202222053271.6

(51) Int. Cl.
*A01D 34/74* (2006.01)
*A01D 34/64* (2006.01)
(Continued)

(52) U.S. Cl.
CPC ............. *A01D 34/74* (2013.01); *A01D 34/64* (2013.01); *A01D 34/824* (2013.01); *A01D 2101/00* (2013.01)

(58) Field of Classification Search
CPC ...... A01D 34/74; A01D 34/64; A01D 34/825; A01D 2101/00; A01D 34/661
See application file for complete search history.

(56) References Cited

U.S. PATENT DOCUMENTS 3,357,165 A * 12/1967 Thon ...................... A01D 34/64
56/16.3
3,611,682 A * 10/1971 Isaacson ................ A01D 34/64
56/14.9
(Continued)

FOREIGN PATENT DOCUMENTS

EP 1269820 A1 * 1/2003 ............. A01D 34/64
JP H10191743 A * 7/1998 ............. A01D 34/64

*Primary Examiner* — Arpad Fabian-Kovacs
(74) *Attorney, Agent, or Firm* — LANWAY IPR SERVICES; Chun-Ming Shih

(57) ABSTRACT

A height adjusting mechanism and a lawn mower containing the same, relates to the technical field of lawn mowers, and solves the technical problems of poor parallelism between a chassis of a mowing tray and the ground and uneven mowing. The height adjusting mechanism includes a connecting rod, a height-adjusting support plate assembly, an adjusting handle assembly and a height-mowing adjusting bracket, wherein the connecting rod and the height-adjusting support plate assembly are rotatably connected between a mowing tray assembly and a frame assembly, so that the mowing tray assembly is suspended on the frame assembly; the height-mowing adjusting bracket is provided between the adjusting handle assembly and the height-adjusting support plate assembly; and the connecting rod and the height-adjusting support plate assembly form a parallelogram mechanism in space, so that when the height of the mowing tray assembly is adjusted, the surface of the chassis of the mowing tray is always parallel to the ground.

9 Claims, 4 Drawing Sheets

(51) Int. Cl.
*A01D 34/82* (2006.01)
*A01D 101/00* (2006.01)

(56) References Cited

U.S. PATENT DOCUMENTS

| | | | | | |
|---|---|---|---|---|---|
| 3,672,137 | A | * | 6/1972 | Hamouz | A01D 34/64 56/15.8 |
| 3,696,594 | A | * | 10/1972 | Freimuth | A01D 34/64 56/15.8 |
| 3,706,186 | A | * | 12/1972 | Hurlburt | A01D 34/74 56/15.8 |
| 4,187,924 | A | * | 2/1980 | Deschamps | B60K 17/28 474/63 |
| 4,291,522 | A | * | 9/1981 | Kawasaki | A01D 34/64 56/15.8 |
| 4,679,382 | A | * | 7/1987 | Saruhashi | A01D 34/64 56/14.7 |
| 4,869,057 | A | * | 9/1989 | Siegrist | A01D 34/64 56/15.8 |
| 5,025,617 | A | * | 6/1991 | Kuhn | A01B 59/044 56/DIG. 9 |
| 5,209,314 | A | * | 5/1993 | Nishiyama | B60K 11/04 180/68.6 |
| 5,483,789 | A | * | 1/1996 | Gummerson | A01D 34/661 56/14.7 |
| 5,956,932 | A | * | 9/1999 | Schmidt | A01D 34/64 56/15.8 |
| 6,293,077 | B1 | * | 9/2001 | Plas | F15B 13/01 56/17.1 |
| 6,494,028 | B2 | * | 12/2002 | Moore | A01D 34/74 56/15.8 |
| 6,530,200 | B1 | * | 3/2003 | Minoura | A01D 34/64 56/15.2 |
| 6,578,656 | B2 | * | 6/2003 | Samejima | B60K 5/00 180/291 |
| 6,584,756 | B2 | * | 7/2003 | Buss | A01D 34/64 56/15.8 |
| 6,688,091 | B2 | * | 2/2004 | Ishimori | A01D 43/0635 56/202 |
| 6,711,885 | B2 | * | 3/2004 | Ferris | A01D 34/64 56/15.8 |
| 7,028,456 | B2 | * | 4/2006 | Thatcher | A01D 34/74 56/15.9 |
| 7,059,109 | B2 | * | 6/2006 | Samejima | A01D 34/64 56/17.1 |
| 7,270,200 | B2 | * | 9/2007 | Goto | B62D 11/04 180/6.48 |
| 7,600,363 | B2 | * | 10/2009 | Porter | A01D 34/82 56/17.1 |
| 10,098,279 | B2 | * | 10/2018 | Zheng | A01D 34/74 |
| 2005/0044836 | A1 | * | 3/2005 | Goto | A01D 69/10 56/14.7 |
| 2007/0169456 | A1 | * | 7/2007 | Komorida | A01D 34/74 56/17.1 |
| 2021/0329835 | A1 | * | 10/2021 | Steiner | A01D 34/662 |

\* cited by examiner

HEIGHT ADJUSTING MECHANISM AND LAWN MOWER CONTAINING SAME

TECHNICAL FIELD

The present disclosure relates to the technical field of lawn mowers, in particular to a height adjusting mechanism and a lawn mower containing the same.

BACKGROUND

A lawn mower is also referred to as a weeder, a grass mower, a lawn trimmer, etc. A lawn mower is a mechanical tool for mowing lawns and vegetation. The lawn mower consists of a cutter head, an engine, a walking wheel, a walking mechanism, blades, a handrail and a control part. According to the travel mode, the lawn mower is divided into: an intelligent semi-automatic towing type, a rear-pushing type, a riding type and a tractor suspension type.

The applicant finds that the prior art has at least the following technical problems.

First, the adjustable range of the mowing gear of the existing riding lawn mower is small, and the selection range of the mowing height is not enough, which leads to the unavailability of some terrains with large difference of level; second, the parallelism between a chassis of a mowing tray and the ground is poor, resulting in uneven mowing.

SUMMARY

The object of the present disclosure is to provide a height adjusting mechanism and a lawn mower containing the same, so as to solve the technical problems of poor parallelism between a chassis of a mowing tray and the ground and uneven mowing in the prior art.

In order to achieve the above object, the present disclosure provides the following technical schemes.

The present disclosure provides a height adjusting mechanism, comprising a connecting rod, a height-adjusting support plate assembly, an adjusting handle assembly and a height-mowing adjusting bracket, wherein:

the connecting rod and the height-adjusting support plate assembly are rotatably connected between a mowing tray assembly and a frame assembly, respectively, so that the mowing tray assembly is suspended on the frame assembly;

the height-mowing adjusting bracket is provided between the adjusting handle assembly and the height-adjusting support plate assembly, and when the adjusting handle assembly rotates, the adjusting handle assembly is capable of being linked with the height-adjusting support plate assembly to complete the height adjustment of the mowing tray assembly;

the connecting rod and the height-adjusting support plate assembly form a parallelogram mechanism in space, so that when the height of the mowing tray assembly is adjusted, the surface of a chassis of the mowing tray is always parallel to the ground.

As a further improvement of the present disclosure, the connecting rod has a rod-shaped structure and is obliquely connected to the middle of the front end of the mowing tray assembly.

As a further improvement of the present disclosure, the height-adjusting support plate assembly has a plate-shaped structure, there are two height-adjusting support plate assemblies in which a left height-adjusting support plate assembly and a right height-adjusting support plate assembly are obliquely provided on both sides of the rear end of the mowing tray assembly, the inclination direction of the height-adjusting support plate assembly is the same as that of the connecting rod, the inclination angles are the same, and the height-adjusting support plate assembly and the connecting rod have mutually parallel structures; the rotary joint between the height-adjusting support plate assembly and the frame assembly and the rotary joint between the height-adjusting support plate assembly and the height-mowing adjusting bracket are located at both ends of the height-mowing adjusting bracket, respectively; the joint between the mowing tray assembly and the height-adjusting support plate assembly is close to the height-mowing adjusting bracket.

As a further improvement of the present disclosure, the height-mowing adjusting bracket comprises a fixed seat, a yielding connecting rod, a fixed plate, a transmission rod and a hook, wherein:

the bottom of the fixed seat is rotatably provided on the frame assembly;

the adjusting handle assembly is connected to the top of the fixed seat and is capable of driving the fixed seat to rotate around a bottom pin shaft;

the yielding connecting rod is Z-shaped, one end of which is connected to the middle of the fixed seat and the other end of which is connected to the fixed plate;

the fixed plate is fixed on the transmission rod;

the transmission rod straddles the top of the frame assembly and is rotatably connected with the frame assembly;

there are two hooks, the tops of which are rotatably connected with both ends of the transmission rod in a limiting manner, and the bottoms of which are movably connected with the height-adjusting support plate assembly, respectively.

As a further improvement of the present disclosure, the lower end of the hook is provided with an external thread section, the height-adjusting support plate assembly is provided with a connecting block, one end of the connecting block is rotatably connected to the height-adjusting support plate assembly through a rotating shaft, and the hook is movably screwed into an internal thread hole of the connecting block.

As a further improvement of the present disclosure, both ends of the transmission rod are provided with L-shaped bent parts, respectively, and the hook is suspended at the tail end of the bent parts.

As a further improvement of the present disclosure, the top of the fixed seat is provided with a U-shaped connecting part, the adjusting handle assembly penetrates through the connecting part, the height adjusting mechanism further comprises a height-mowing force adjusting tension spring which is provided in the connecting part and sleeved outside the adjusting handle assembly, one end of the height-mowing force adjusting tension spring is connected with the connecting part and the other end thereof is connected with the adjusting handle assembly.

As a further improvement of the present disclosure, the adjusting handle assembly comprises a gear plate and an adjusting handle, the gear plate is fixed on the frame assembly and is provided with a plurality of gear holes, and the adjusting handle penetrates through the gear plate.

As a further improvement of the present disclosure, the number of gear holes is 13, when the adjusting handle is located in a first gear hole, the distance between the surface of the chassis of the mowing tray assembly and the ground is 1 inch, and when the adjusting handle is located in a last gear hole, the distance between the surface of the chassis of the mowing tray assembly and the ground is 4 inches.

The present disclosure provides a lawn mower, wherein the lawn mower is a riding lawn mower comprising the height adjusting mechanism.

Compared with the prior art, the present disclosure has the following beneficial effects.

The height adjusting mechanism provided by the present disclosure is connected between the frame assembly and the mowing tray assembly through the connecting rod and the height-adjusting support plate assembly, and has the same inclination direction and the same inclination angle to form a parallelogram structure, so that when the adjusting handle assembly adjusts the mowing height of the mowing tray, the parallelism between the surface of the chassis of the mowing tray and the ground can always be maintained, and mowing is more even. 13 gear holes are provided, so that the selection range of the mowing gear and the selection range of the mowing height are wide. A connecting part is provided on the fixed seat, and a height-mowing force adjusting tension spring is provided in the connecting part, and the height-mowing force adjusting tension spring counterbalances the gravity of the chassis of the mowing tray, so that the adjusting force of the adjusting handle assembly can be reduced, and it is convenient to adjust.

BRIEF DESCRIPTION OF THE DRAWINGS

In order to explain the embodiments of the present disclosure or the technical schemes in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without any creative effort.

In the figures, 100, mowing tray assembly; 200, connecting rod; 300, height-adjusting support plate assembly; 301, connecting block; 400, height-mowing adjusting bracket; 401, fixed seat; 402, yielding connecting rod; 403, fixed plate; 404, transmission rod; 405, hook; 406, height-mowing force adjusting tension spring; 500, adjusting handle assembly; 501, gear plate; 502, adjusting handle; 600, frame assembly.

DETAILED DESCRIPTION OF THE EMBODIMENTS

In order to make the object, technical scheme and advantages of the present disclosure clearer, the technical scheme of the present disclosure will be described in detail hereinafter. Obviously, the described embodiments are only part of the embodiments of the present disclosure, rather than all of the embodiments. Based on the embodiment of the present disclosure, all other embodiments obtained by those skilled in the art without any creative effort belong to the scope of protection of the present disclosure.

Figure 3:
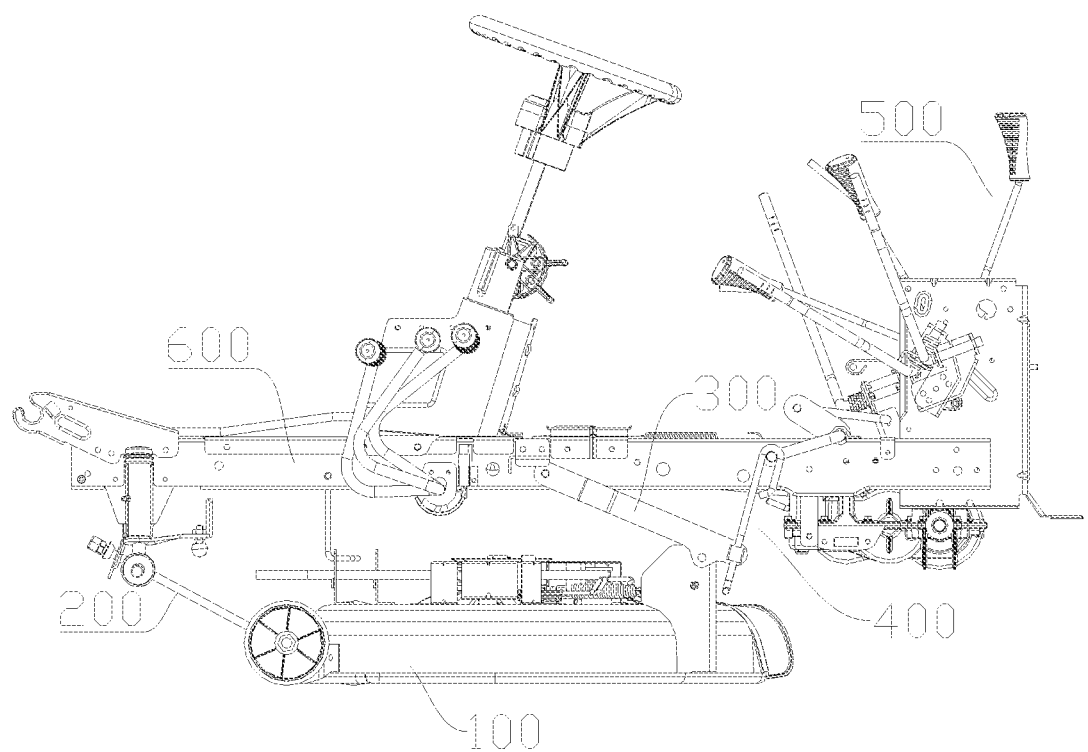
FIG. 3 is a side view of a height adjusting mechanism in a lawn mower according to the present disclosure.
Figure 4:
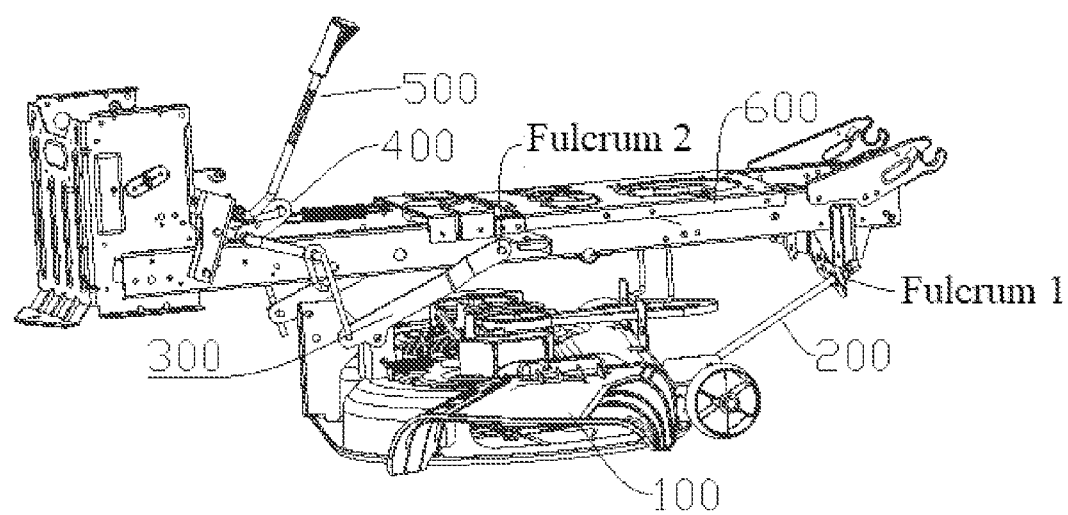
FIG. 4 is a schematic diagram of a three-dimensional structure of a height adjusting mechanism according to the present disclosure.
Figure 5:
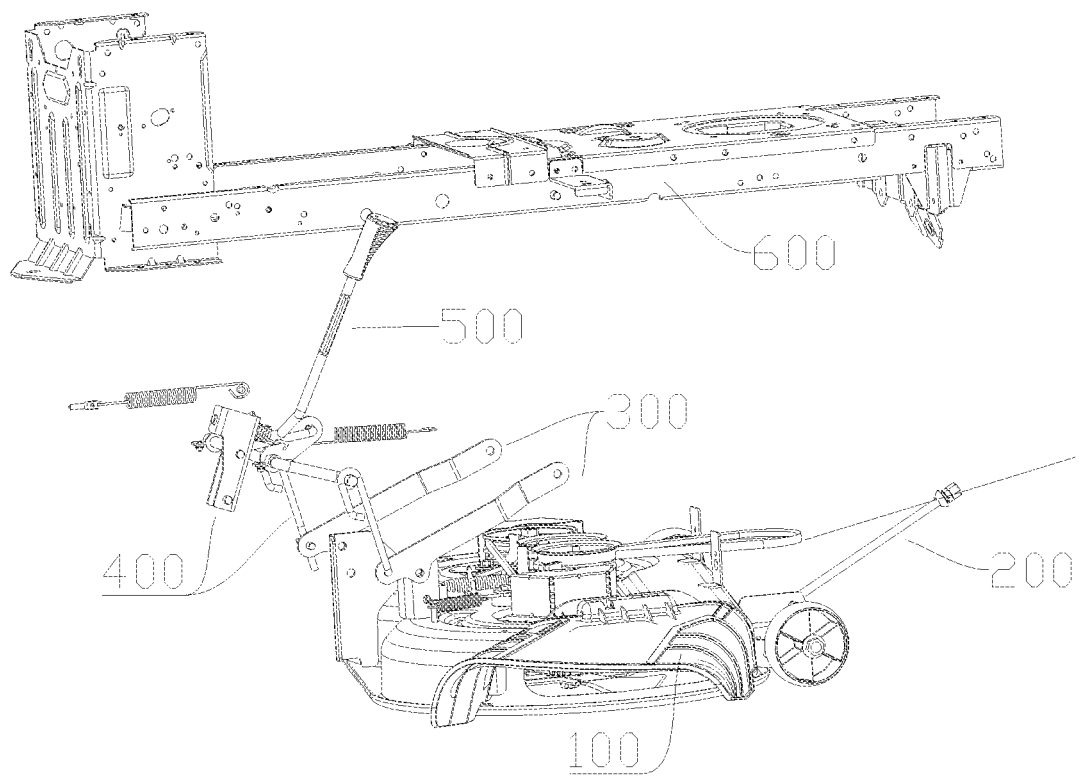
FIG. 5 is a schematic structural diagram of a height adjusting mechanism after being detached from a frame assembly according to the present disclosure.

As shown in FIGS. 3-5, the present disclosure provides a height adjusting mechanism, comprising a connecting rod 200, a height-adjusting support plate assembly 300, an adjusting handle assembly 500 and a height-mowing adjusting bracket 400, wherein:

the connecting rod 200 and the height-adjusting support plate assembly 300 are rotatably connected between the mowing tray assembly 100 and the frame assembly 600, respectively, so that the mowing tray assembly 100 is suspended on the frame assembly 600;

the height-mowing adjusting bracket 400 is provided between the adjusting handle assembly 500 and the height-adjusting support plate assembly 300, and when the adjusting handle assembly 500 rotates, the adjusting handle assembly is capable of being linked with the height-adjusting support plate assembly 300 to complete the height adjustment of the mowing tray assembly 100;

the connecting rod 200 and the height-adjusting support plate assembly 300 form a parallelogram mechanism in space, so that when the height of the mowing tray assembly 100 is adjusted, the surface of the chassis of the mowing tray is always parallel to the ground.

It should be noted that the adjusting handle assembly 500 in FIG. 3 shows a state diagram in three different positions, instead of providing three adjusting handle assemblies 500.

The height adjusting mechanism provided by the present disclosure is connected between the frame assembly 600 and the mowing tray assembly 100 through the connecting rod 200 and the height-adjusting support plate assembly 300, and has the same inclination direction and the same inclination angle to form a parallelogram structure, so that when the adjusting handle assembly 500 adjusts the mowing height of the mowing tray, the parallelism between the surface of the chassis of the mowing tray and the ground can always be maintained, and mowing is more even.

As shown in FIGS. 3-6, further, in this embodiment, the connecting rod 200 has a rod-shaped structure and is obliquely connected to the middle of the front end of the mowing tray assembly 100. Specifically, one end of the connecting rod 200 is fixed at the fulcrum 1 below the frame assembly 600, and the other end of the connecting rod 200 is rotatably connected to the mowing tray assembly 100 through a spool or a rotating shaft. A limited rotatable connection is formed by an R pin to prevent the connecting rod 200 from coming out.

The mowing tray assembly 100 can be suspended under the frame assembly 600 by the connecting rod 200, and is connected by a connecting rod 200, which not only realizes the hanging effect, but also has a simple structure.

As shown in FIG. 3 to FIG. 6, the height-adjusting support plate assembly 300 has a plate-shaped structure, there are two height-adjusting support plate assemblies in which a left height-adjusting support plate assembly and a right height-adjusting support plate assembly are obliquely provided on both sides of the rear end of the mowing tray assembly 100, the inclination direction of the height-adjusting support plate assembly 300 is the same as that of the connecting rod 200, the inclination angles are the same, and the height-adjusting support plate assembly and the connecting rod have mutually parallel structures; the rotary joint between the height-adjusting support plate assembly 300 and the frame assembly 600 and the rotary joint between the height-adjusting support plate assembly and the height-mowing adjusting bracket 400 are located at both ends of the height-mowing adjusting bracket 400, respectively; the joint between the mowing tray assembly 100 and the height-adjusting support plate assembly 300 is close to the height-mowing adjusting bracket 400. Specifically, the height-adjusting support plate assembly 300 is rotatably connected with the fulcrum 2 of the frame assembly 600.

A left height-adjusting support plate assembly 300 and a right height-adjusting support plate assembly 300 are provided on both sides of the mowing tray assembly 100, respectively, so that a three-point connection structure is formed between the height-adjusting support plate assemblies 300 and the connecting rod 200, and the stability of the suspended mowing tray assembly 100 can be ensured.

Figure 6:
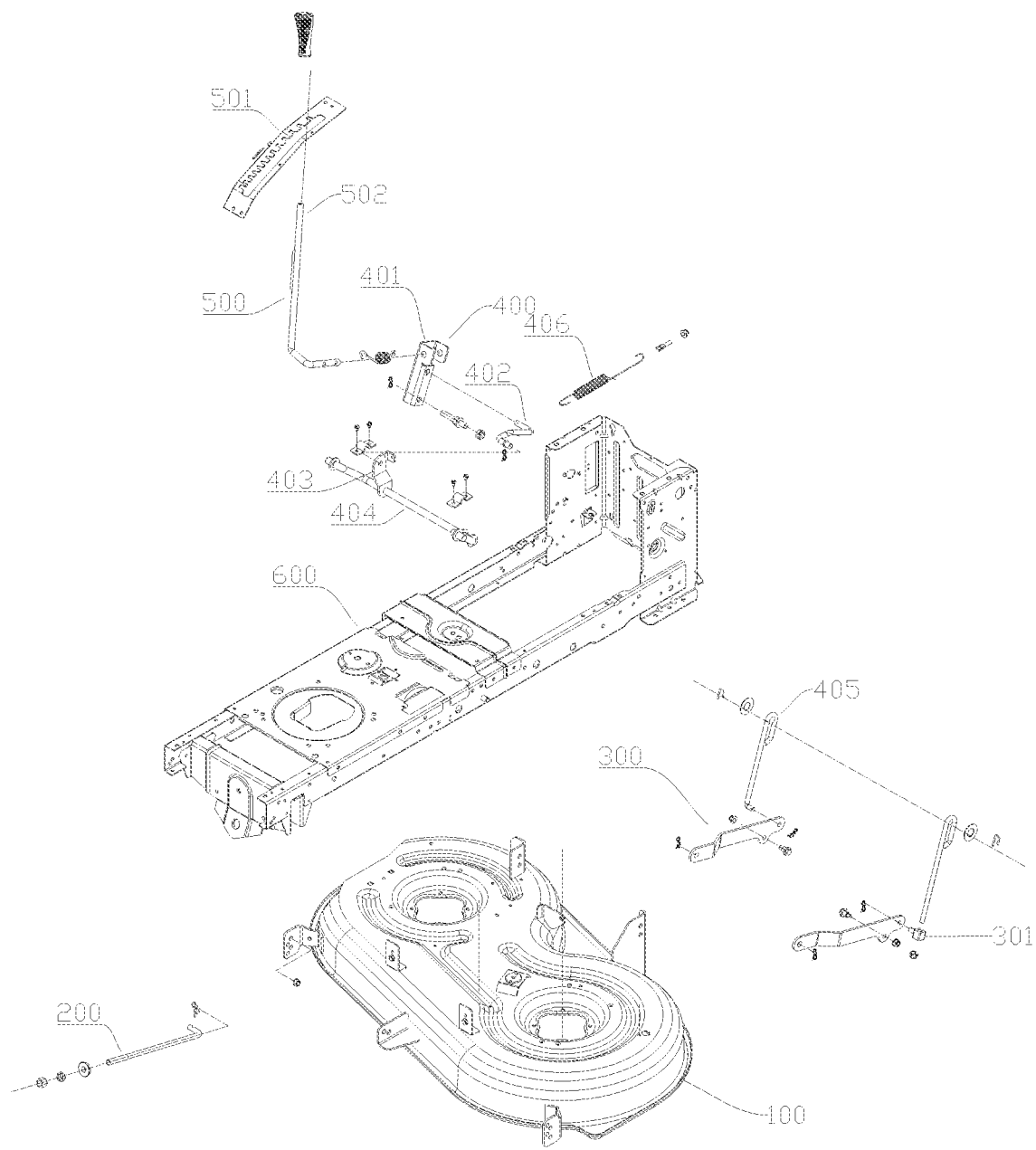
FIG. 6 is an exploded view of a height adjusting mechanism according to the present disclosure.

As shown in FIG. 6, as an alternative embodiment of the present disclosure, the height-mowing adjusting bracket 400 comprises a fixed seat 401, a yielding connecting rod 402, a fixed plate 403, a transmission rod 404 and a hook 405, wherein:

the bottom of the fixed seat 401 is rotatably provided on the frame assembly 600;

the adjusting handle assembly 500 is connected to the top of the fixed seat 401 and is capable of driving the fixed seat 401 to rotate around a bottom pin shaft;

the yielding connecting rod 402 is Z-shaped, one end of which is connected to the middle of the fixed seat 401 and the other end of which is connected to the fixed plate 403;

the fixed plate 403 is fixed on the transmission rod 404;

the transmission rod 404 straddles the top of the frame assembly 600 and is rotatably connected with the frame assembly 600;

there are two hooks 405, the tops of which are rotatably connected with both ends of the transmission rod 404 in a limiting manner, and the bottoms of which are movably connected with the height-adjusting support plate assembly 300, respectively.

The above structural arrangement not only can adjust the mowing height, but also can ensure the parallelism between the mowing tray assembly 100 and the ground while the height is adjusted and can ensure the evenness of the mowing height.

Further, the lower end of the hook 405 is provided with an external thread section, the height-adjusting support plate assembly 300 is provided with a connecting block 301, one end of the connecting block 301 is rotatably connected to the height-adjusting support plate assembly 300 through a rotating shaft, and the hook 405 is movably screwed into the internal thread hole of the connecting block 301. The above structural arrangement can adjust the height of the connection between the hook 405 and the mowing tray assembly 100. Specifically, the height at the left side of the chassis of the mowing tray assembly 100 can be finely adjusted through threads, so that both sides of the chassis keep balance to reduce the manufacturing error.

Further, both ends of the transmission rod 404 are provided with L-shaped bent parts, respectively, and the hook 405 is suspended at the tail end of the bent parts.

The bent parts are provided. The bent parts are located at the side of the frame assembly 600 and below the top of the frame assembly 600. The hook 405 will not protrude from the top of the frame assembly 600 when being suspended, thus avoiding interference with components on the frame assembly 600.

Further, the top of the fixed seat 401 is provided with a U-shaped connecting part, the adjusting handle assembly 500 penetrates through the connecting part, the height adjusting mechanism further comprises a height-mowing force adjusting tension spring 406 which is provided in the connecting part and sleeved outside the adjusting handle assembly 500, one end of the height-mowing force adjusting tension spring 406 is connected with the connecting part and the other end thereof is connected with the adjusting handle assembly 500.

The height-mowing force adjusting tension spring 406 is provided, which counterbalances the gravity of the chassis, so that the adjusting force of the adjusting handle assembly 500 can be reduced, and it is convenient to adjust.

As shown in FIGS. 3, 4 and 6, as an alternative embodiment of the present disclosure, the adjusting handle assembly 500 comprises a gear plate 501 and an adjusting handle 502. The gear plate 501 is fixed on the frame assembly 600 and is provided with a plurality of gear holes, and the adjusting handle 502 penetrates through the gear plate 501.

Specifically, the number of gear holes is 13. When the adjusting handle 502 is located in a first gear hole, the distance between the surface of the chassis of the mowing tray assembly 100 and the ground is 1 inch, and when the adjusting handle 502 is located in a last gear hole, the distance between the surface of the chassis of the mowing tray assembly 100 and the ground is 4 inches.

13 gears are provided, and the height can be adjusted within the range of 1-4 inches, so that the selection range of the mowing gear and the selection range of the mowing height are wide.

Figure 1:
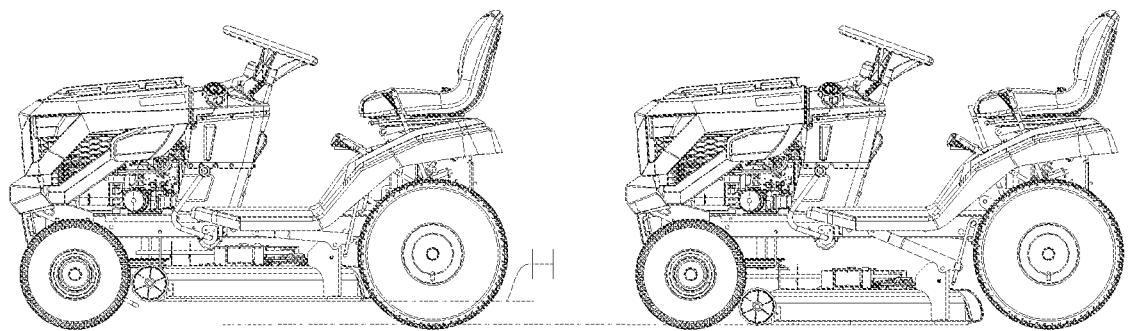
FIG. 1 is a schematic structural diagram of a height adjusting mechanism before and after being lifted in a lawn mower according to the present disclosure.
Figure 2:
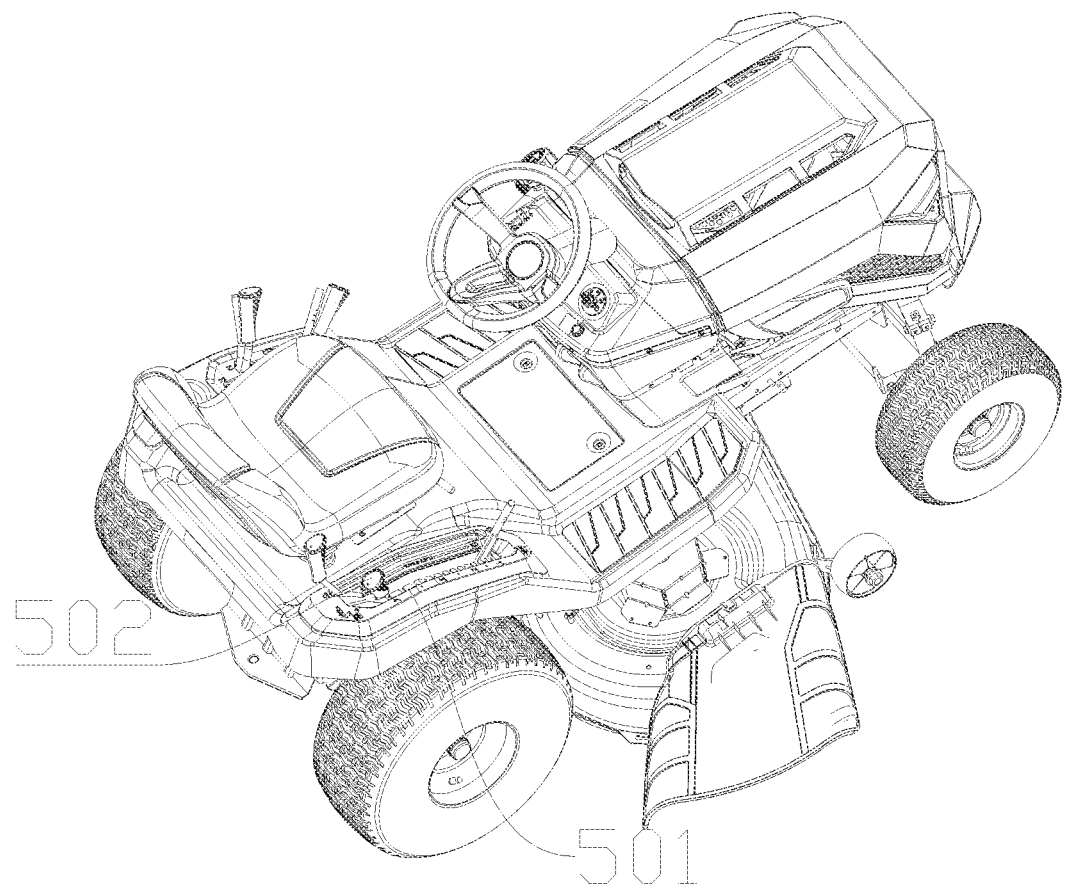
FIG. 2 is a schematic diagram of a three-dimensional structure of a lawn mower according to the present disclosure

As shown in FIGS. 1-3, the lawn mower provided by the present disclosure is a riding lawn mower, comprising the height adjusting mechanism.

As shown in FIG. 1, the height adjusting mechanism can adjust the height H value between the surface of the chassis of the mowing tray assembly and the ground to be suitable for the mowing height requirements of different terrains and different users.

It should be noted that, in the present disclosure, the connection relationship between the height adjusting mechanism and the frame assembly 600 is detachable connection, rotatable connection, or detachable rotating connection, which is convenient to disassemble. Generally, an R pin is used to realize limiting and disassembly, so that tools are not needed for disassembly.

First of all, it should be noted that "inward" is the direction towards the center of the accommodation space, and "outward" is the direction away from the center of the accommodation space.

In the description of the present disclosure, it should be understood that the orientational or positional relationships indicated by the terms such as "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential" are based on the orientational or positional relationships shown in FIG. 1 only for the convenience of describing the present disclosure and simplifying the description, rather than indicate or imply that the referred devices or elements must have a specific orientation, be constructed and operated in a specific orientation, and therefore should not be construed as limiting the present disclosure.

In addition, the terms such as "first" and "second" are only used for the purpose of description, and cannot be understood as indicating or implying relative importance or implicitly indicating the number of indicated technical features. Therefore, the features defined with "first" and "second" can include at least one of these features explicitly or implicitly. In the description of the present disclosure, "a plurality of" means at least two, such as two, three, etc., unless otherwise specifically defined.

In the present disclosure, unless otherwise specified and defined expressly, the terms such as "mount", "link", "connect" and "fix" should be understood broadly, for example, it can be fixed connection, detachable connection or integral connection; or mechanical connection or electrical connection; or direct connection or indirect connection through an intermediate medium, or internal communication in two elements or interaction between two elements, unless otherwise specified. For those skilled in the art, the specific meanings of the above terms in the present disclosure can be understood according to specific situations.

In the present disclosure, unless otherwise specified and defined, the first feature "above" or "below" the second feature may be the direct contact between the first feature and the second feature, or the indirect contact between the first feature and the second feature through an intermediate medium. Further, the first feature is "on", "above" and "over" the second feature, indicating that the first feature is directly above or obliquely above the second feature, or only indicating that the horizontal height of the first feature is higher than that of the second feature. The first feature is "below", "under" and "underneath" the second feature, indicating that the first feature is directly under or obliquely under the second feature, or only indicating that the horizontal height of the first feature is smaller than that of the second feature.

In the description of this specification, the description referring to the terms "one embodiment", "some embodiments", "examples", "specific examples" or "some examples" means that the specific features, structures, materials or characteristics described in connection with this embodiment or example are included in at least one embodiment or example of the present disclosure. In this specification, the schematic expressions of the above terms do not necessarily refer to the same embodiment or example. Further, the specific features, structures, materials or characteristics described may be combined in any one or more embodiments or examples in a suitable manner. In addition, those skilled in the art can incorporate and combine different embodiments or examples and features of different embodiments or examples described in this specification without contradicting each other.

The above only describes the specific embodiments of the present disclosure, but the scope of protection of the present disclosure is not limited thereto. Any changes or substitutions conceivable to those skilled in the art within the technical scope disclosed by the present disclosure should be covered within the scope of protection of the present disclosure. Therefore, the scope of protection of the present disclosure should be based on the scope of protection of the claims.

What is claimed is:

1. A height adjusting mechanism, comprising a connecting rod, a height-adjusting support plate assembly, an adjusting handle assembly and a height-mowing adjusting bracket, wherein:

the connecting rod and the height-adjusting support plate assembly are rotatably connected between a mowing tray assembly and a frame assembly, respectively, so that the mowing tray assembly is suspended on the frame assembly;

the height-mowing adjusting bracket is provided between the adjusting handle assembly and the height-adjusting support plate assembly, and when the adjusting handle assembly rotates, the adjusting handle assembly is capable of being linked with the height-adjusting support plate assembly to complete the height adjustment of the mowing tray assembly;

the connecting rod and the height-adjusting support plate assembly form a parallelogram mechanism in space, so that when the height of the mowing tray assembly is adjusted, the surface of a chassis of the mowing tray is always parallel to the ground;

wherein the height-mowing adjusting bracket comprises a fixed seat, a yielding connecting rod, a fixed plate, a transmission rod and a hook, wherein:

the bottom of the fixed seat is rotatably provided on the frame assembly;

the adjusting handle assembly is connected to the top of the fixed seat and is capable of driving the fixed seat to rotate around a bottom pin shaft;

the yielding connecting rod is Z-shaped, one end of which is connected to the middle of the fixed seat and the other end of which is connected to the fixed plate;

the fixed plate is fixed on the transmission rod;

the transmission rod straddles the top of the frame assembly and is rotatably connected with the frame assembly;

there are two hooks, the tops of which are rotatably connected with both ends of the transmission rod in a limiting manner, and the bottoms of which are movably connected with the height-adjusting support plate assembly, respectively.

2. The height adjusting mechanism according to claim 1, wherein the connecting rod has a rod-shaped structure and is obliquely connected to the middle of the front end of the mowing tray assembly.

3. The height adjusting mechanism according to claim 1, wherein the height-adjusting support plate assembly has a plate-shaped structure, there are two height-adjusting support plate assemblies in which a left height-adjusting support plate assembly and a right height-adjusting support plate assembly are obliquely provided on both sides of the rear end of the mowing tray assembly, the inclination direction of the height-adjusting support plate assembly is the same as that of the connecting rod, the inclination angles are the same, and the height-adjusting support plate assembly and the connecting rod have mutually parallel structures; the joint between the mowing tray assembly and the height-adjusting support plate assembly is close to the height-mowing adjusting bracket.

4. The height adjusting mechanism according to claim 1, wherein the lower end of the hook is provided with an external thread section, the height-adjusting support plate assembly is provided with a connecting block, one end of the connecting block is rotatably connected to the height-adjusting support plate assembly through a rotating shaft, and the hook is movably screwed into an internal thread hole of the connecting block.

5. The height adjusting mechanism according to claim 1, wherein both ends of the transmission rod are provided with L-shaped bent parts, respectively, and the hook is suspended at the tail end of the bent parts.

6. The height adjusting mechanism according to claim 1, wherein the top of the fixed seat is provided with a U-shaped connecting part, the adjusting handle assembly penetrates through the connecting part, the height adjusting mechanism further comprises a height-mowing force adjusting tension spring which is provided in the connecting part and sleeved outside the adjusting handle assembly, one end of the height-mowing force adjusting tension spring is connected with the connecting part and the other end thereof is connected with the adjusting handle assembly.

7. The height adjusting mechanism according to claim 1, wherein the adjusting handle assembly comprises a gear plate and an adjusting handle, the gear plate is fixed on the frame assembly and is provided with a plurality of gear holes, and the adjusting handle penetrates through the gear plate.

8. The height adjusting mechanism according to claim 7, wherein the number of gear holes is 13, when the adjusting handle is located in a first gear hole, the distance between the surface of the chassis of the mowing tray assembly and the ground is 1 inch, and when the adjusting handle is located in a last gear hole, the distance between the surface of the chassis of the mowing tray assembly and the ground is 4 inches.

9. A lawn mower, wherein the lawn mower is a riding lawn mower, comprising the height adjusting mechanism according to claim 1.

\* \* \* \* \*